United States Patent
Liu et al.

(10) Patent No.: US 9,123,140 B1
(45) Date of Patent: Sep. 1, 2015

(54) RECOVERING DETAILS IN SINGLE FRAME SUPER RESOLUTION IMAGES

(71) Applicant: Pixelworks, Inc., Portland, OR (US)

(72) Inventors: Guodong Liu, Shanghai (CN); Bob Zhang, Santa Clara, CA (US); Junhua Chen, Shanghai (CN); Yue Ma, Pleasanton, CA (US)

(73) Assignee: Pixelworks, Inc., Portland, OR (US)

( * ) Notice: Subject to any disclaimer, the term of this patent is extended or adjusted under 35 U.S.C. 154(b) by 52 days.

(21) Appl. No.: 14/036,718

(22) Filed: Sep. 25, 2013

(51) Int. Cl.
 *G06K 9/32* (2006.01)
 *G06T 3/40* (2006.01)

(52) U.S. Cl.
 CPC .................................. *G06T 3/4053* (2013.01)

(58) Field of Classification Search
 None
 See application file for complete search history.

(56) References Cited

U.S. PATENT DOCUMENTS

| | | | |
|---|---|---|---|
| 8,675,999 B1 * | 3/2014 | Liang et al. | 382/299 |
| 2002/0172434 A1 * | 11/2002 | Freeman et al. | 382/299 |
| 2010/0124383 A1 * | 5/2010 | Wang et al. | 382/299 |
| 2011/0206296 A1 * | 8/2011 | Sakaguchi et al. | 382/299 |
| 2011/0221966 A1 * | 9/2011 | Hsieh et al. | 348/665 |

* cited by examiner

*Primary Examiner* — Phuoc Tran
(74) *Attorney, Agent, or Firm* — Marger Johnson & McCollom PC (57) ABSTRACT

A method of generating a super-resolution image from a single frame of image data, includes receiving, at a processor, a frame of image data have a first resolution as an original image layer, generating an estimated super-resolution image as a high resolution image layer, the estimated super-resolution image having a second resolution, the second resolution being higher than the first resolution from the frame of original image data, generating a low resolution image layer by down sampling the frame of image data, the low resolution image layer having a resolution lower than the first resolution, down sampling the estimated super-resolution image to produce an intermediate image layer having an intermediate resolution between the first resolution and the second resolution, and selectively copying image data from the original image layer to the super-resolution image layer to produce a final super-resolution image.

12 Claims, 6 Drawing Sheets

Figure 11

RECOVERING DETAILS IN SINGLE FRAME SUPER RESOLUTION IMAGES

BACKGROUND

Display panels or monitors continue to increase in resolution, such as 1080p, 4k×2k, etc. Many image sources have a lower resolution than the displays. When the panel displays these sources in a display with higher resolution, traditional scaling techniques do not produce high fidelity results with rich details and sharp edges. Examples of these traditional techniques include one-dimensional poly phase scaling (1D scaler), bilinear interpolation, bi-cubic interpolation, edge-guided (2D) scaling, etc. Super resolution techniques offer a solution to bridge the gap between advanced, higher resolution displays and lower resolution video sources.

Multi-image super resolution techniques construct a high resolution image from multiple low resolution images by fusing information among them. These algorithms can bring some details with smaller ratios of magnification in zooming. When larger ratios of magnification are needed, they cannot give enough details. Further, even at smaller ratios, if the motion is not in the right range, the ability of these techniques to reconstruct high frequency details suffers. These techniques also require many hardware resources and complex logic.

Different types of single frame super resolution (SFSR) techniques exist. Typically, these processes may involve using comparisons between the original low resolution image and various scaled versions of the low resolution image to generate the high resolution image at the desired magnification, or higher resolution. However, they generally do not recover enough details and can even suppress details that look like noise. In fact several of the algorithms use techniques similar to non-local means noise reduction. These approaches keep the sharpness of edges at the expense of more random details. Because the techniques prefer edges over details, the edges have abrupt transitions, making the resulting image look like an oil painting with hard edges between colors.

The original low resolution image provides the best source for details and edges which can be taken as examples for the resulting higher resolution image, if a match can be found Using the original image provides details and edges that are more natural when compared to other intermediate layers in most self similarity super resolution (SSSR) processes. Using the original low resolution image, often referred to as layer 1×, has benefits. However, a problem arises because in most SSSR processes more than 90% of the high-resolution examples come from the closest low resolution layer (25-33% increase in magnification) and not the 1× layer. Typically, this results from a comparison of the data in the closest low resolution layer and the original layer using the sum of absolute differences (SAD) or a weighted sum of square distance (SSD) process. The closest lower resolution layer to the desired high resolution layer typically has the smallest differences. This results in the data from the closest lower resolution layer being used, rather than the data from the original low resolution layer.

DETAILED DESCRIPTION OF THE EMBODIMENTS

Single frame super resolution techniques do not have multiple frames of low resolution data to use as a source of information to generate a high resolution image. Instead, many of these techniques rely upon the occurrence of patterns within a single frame that are very similar to a current region or 'patch' that is being replicated. Typically, the patches are compared between different scaled images, relying the most heavily on the nearest resolution to the resolution of the image generated. This loses some of the details of the image that are present in the original low resolution image.

Figure 1:
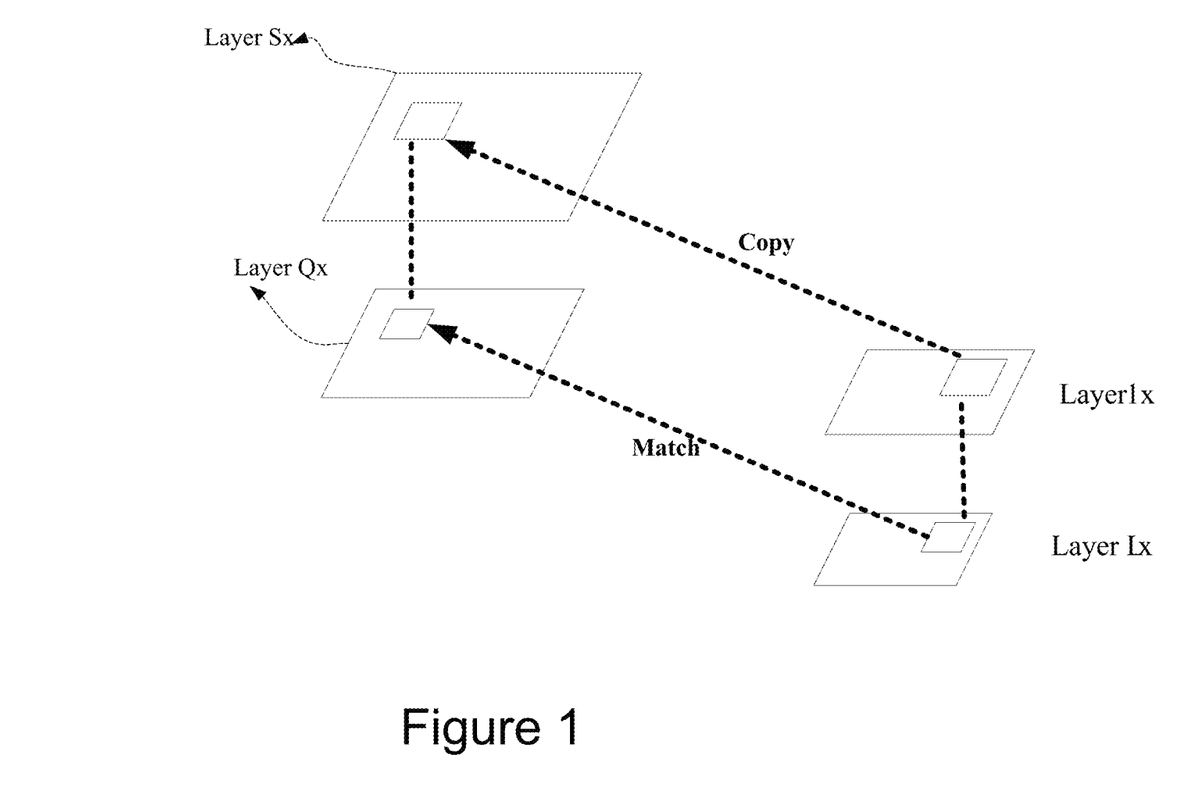
FIG. 1 shows a graphical representation of an embodiment of a method of generating a super resolution image.

As discussed here, it is possible to perform patch matching between scaled images but still locate and copy the image data only from the original low resolution image. FIG. 1 shows a graphical representation of an embodiment of such a method. In FIG. 1, the original image is referred to as 'Layer 1×.' This is the original input image and has a particular resolution. This may be referred to as a low resolution image in some descriptions, as it has lower resolution than the high resolution image in the method. However, because even lower resolution images exist in the methods discussed here, for the purposes of this discussion, the input image will be referred to as the original image layer or 1× layer. An 'image layer' designates image data at a particular resolution.

In FIG. 1, the original image layer 1× is used to generate a high resolution layer using whatever scaling technique is desired. These techniques may include something like a one-dimensional scaler (1D scaler) employing polyphase filters, a 2D scaler or even a self-similarity super-resolution technique, etc. The generated high resolution layer at this point may be referred to as the 'estimated' super resolution or high resolution image layer, layer Sx. This layer may be altered in further processing taught in the methods here.

The methods used here down sample the layer Sx by some scaling factor, referred to here as Lx. This results in an intermediate image layer referred to here as Qx, where Qx=Sx*Lx. The original input image layer 1× also undergoes down sampling by the same scaling factor, resulting in a low resolution image layer Lx.

Once the various image layers are populated, the process performs patch matching between the intermediate layer Qx and the low resolution layer Lx. The patch matching process may take the form of identifying a particular patch or region in one of the two layers and then searching the other layer for a match. In the preferred embodiment, the patch is identified in the layer Sx and the search is performed using the layers Qx and Lx. Typically, a patch matching process compares image data in the identified patch with patches of image data in the layer being searched using a comparison such as the sum of absolute differences (SAD) or a weighted sum of square distance (SSD) process.

Figures 2, 3:
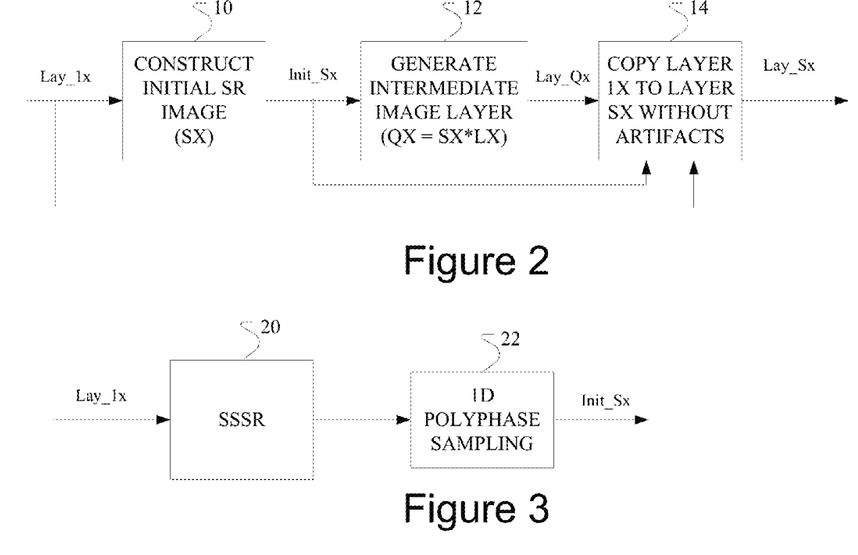
FIG. 2 shows a flowchart of an embodiment of a method of generating a super resolution image.
FIG. 3 shows a flowchart of an embodiment of a method of generating an initial super resolution image.

Once a match is found, the corresponding location of the patch in layer Lx is found in layer 1×. That information is then copied from layer 1× to a location in layer Sx that corresponds to the matching patch in layer Qx. FIG. 2 shows a flowchart of an embodiment of this process. A different approach to copying information between layers to generate a high resolution image layer is found in co-pending U.S. patent application Ser. No. 14/011,532, "Self-Similarity Based Single Frame Super-Resolution," filed Aug. 27, 2013.

Figure 4:
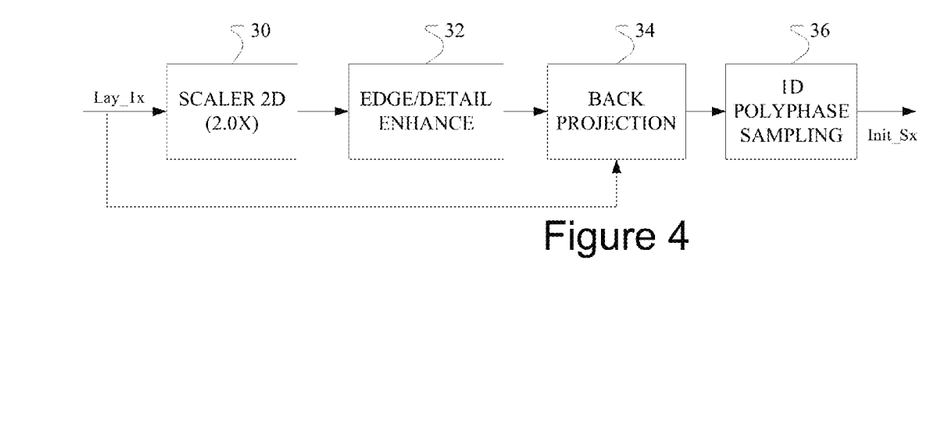
FIG. 4 shows a flowchart of an embodiment of an alternative method of generating an initial super resolution image.

In FIG. 2, the initial layer 1× is taken as in input to generate an initial super resolution image, Init_Sx at 10. FIGS. 3 and 4 show flowcharts of embodiments of generating such an image. For example, in FIG. 3, the input image layer 1× is used in a self-similarity super-resolution process at 20. One possibility is the self-similarity super-resolution process disclosed by Glasner, et. al., in *Super-Resolution from a Single Image*, presented at the International Conference on Computer Vision, October 2009, (http://www.wisdom.weizmann.ac.il/~vision/single_image_SR/files/single_image_SR.pdf). Because this approach typically does not equal the scaling ratio Sx, one-dimensional (1D) polyphase sampling may be applied at 22 to get to the proper ratio.

An alternative approach of generating the initial super-resolution image would be to use a two-dimensional scaler (scaler 2D) at 30, which also provides a result without jagged edge artifacts, but may not be sharp enough so it looks blurry. One could perform edge and detail enhancement at 32, then possibly use back projection to correct the scaling errors at 34. Because the scaling ratio for common 2D scalers is 2, the process may again need to apply 1D polyphase sampling to get to the desired Sx.

However the generation of the initial super-resolution image is performed in FIG. 2, the result init_Sx then undergoes down sampling to produce the intermediate image layer Qx. This may be done in whatever manner the designer sees fit, such as using a 1D polyphase process. Another part of this process generates a down sampled image of the initial 1× layer to produce the low resolution image layer Lx. At 14 in FIG. 2, the information from layer 1× is then copied up to the layer Sx to produce a final high resolution image layer. The information is copied selectively to, or blended with the init_Sx layer, depending upon the nature of the image data in the patch, as will be discussed in more detail later.

Figure 5:
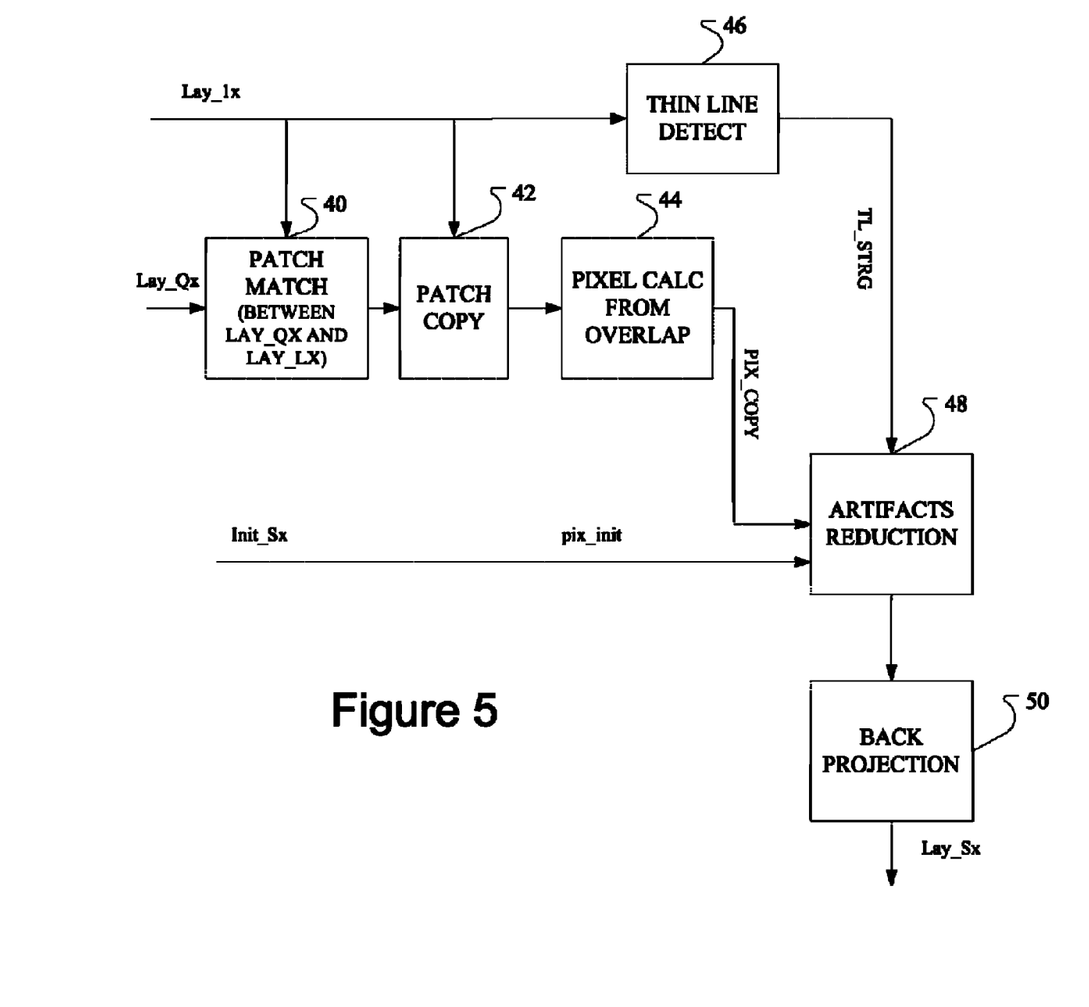
FIG. 5 shows a flowchart of an embodiment of a method of copying image data from an original image to a high resolution layer.

FIG. 5 shows a flowchart of an embodiment of a process to selectively copy information from layer 1× to layer Sx. If the information is not copied, the image information already present in the initial super-resolution layer is retained. In FIG. 5, the patch match process is performed between the intermediate layer Qx and the low resolution layer Lx at 40. If a match is found, the data from the original image layer 1× is copied up to the high resolution layer at 42, typically replacing the data from the initial super resolution layer, Init_Sx. Due to overlap between the copied patches, the pixels are calculated by use of weighted average in overlapping positions at 44.

As mentioned above, there may be some artifacts or patterns that do not match or copy as well as the process used to generate the init_Sx layer, such as thin lines, checkerboards, etc. The presence of thin lines is detected at 46 and the resulting information from that process TL_STRG, the pixels to be copied, PIX_COPY, and the initial layer are then processed to reduce artifacts at 48. An optional back projection process 50 allows for correction of the data, and the resulting super-resolution image Lay_Sx is produced.

Figure 6:
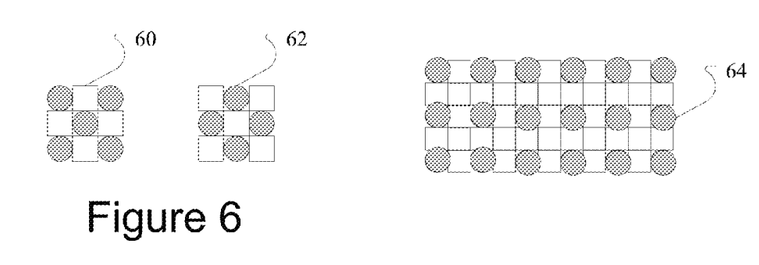
FIG. 6-8 show examples of special pixel patterns.
Figure 7:
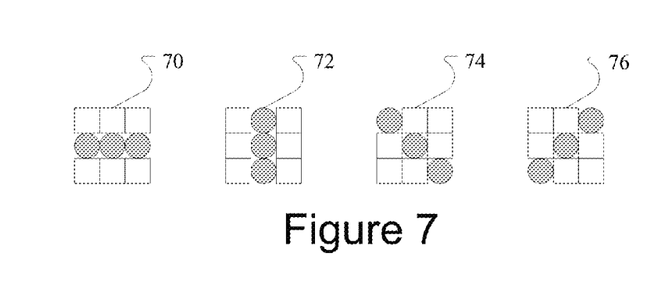
Figure 8:
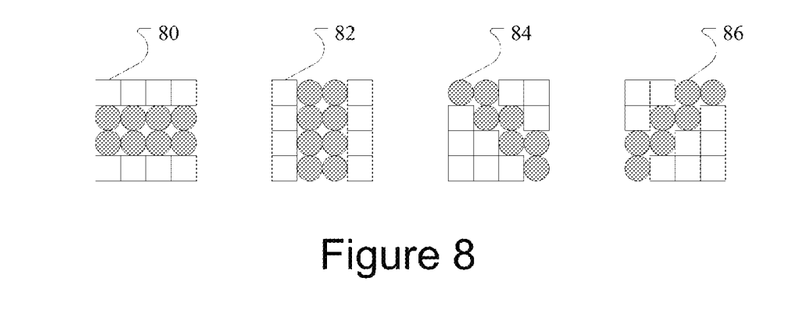

The artifacts reduction and thin line detection assist in making the determination as to whether to copy the data from the layer 1× or not. For some patterns in the image data, there may not be a good enough match to allow identification of the data to be copied. Examples of these patterns are shown in FIGS. 6-8, such as the chessboard patterns 60 and 62, and the basket weave pattern 64 in FIG. 6. The round grayed circles represent the pixels of the image with one color and the white square representing the pixels of the image with a different color. FIG. 7 show examples of one-pixel wide lines, such as horizontal line 70, vertical line 72 and diagonal lines 74 and 76. FIG. 8 shows similar lines for two-pixel wide lines, such as horizontal lines 80, vertical line 82 and diagonal lines 84 and 86. These patterns often result in lower quality results if the data is copied, so identifying them in the original input image allows the process to skip the match and copy process for these patterns and rely instead on the data in the initial super-resolution layer.

Figure 9:
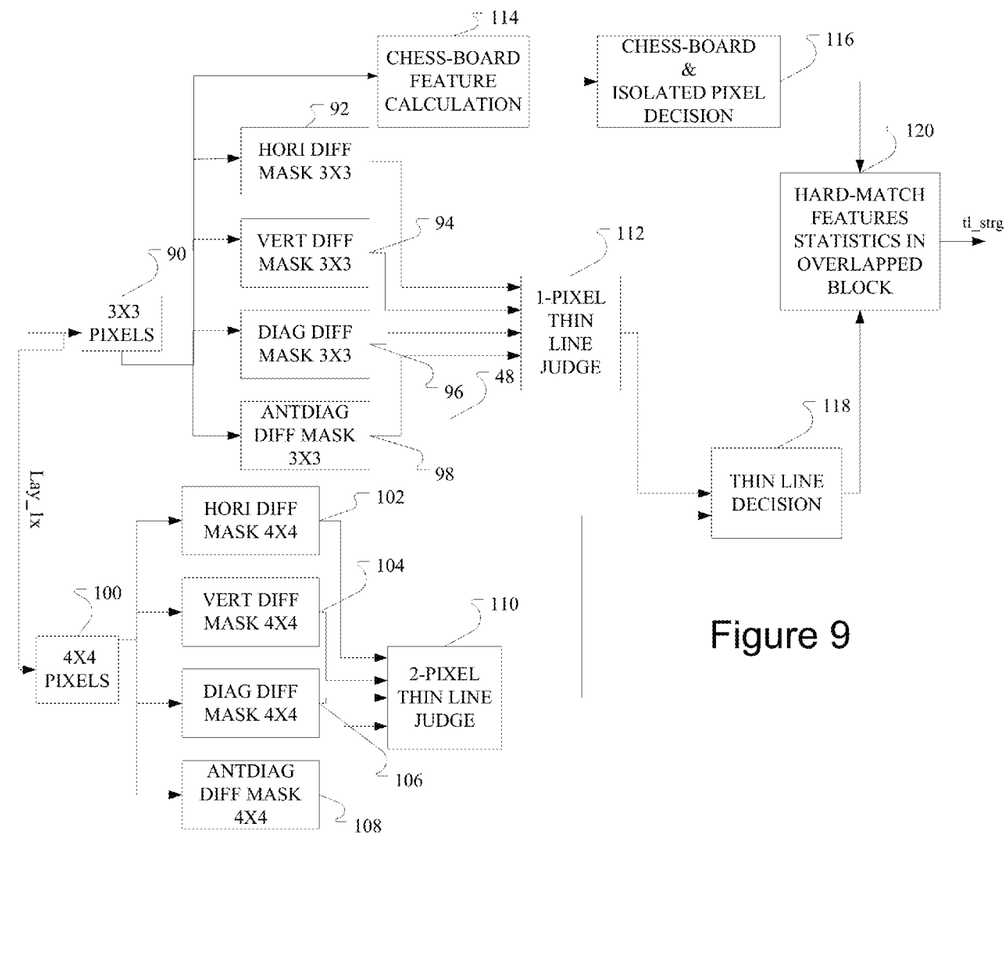
FIG. 9 shows a flowchart of an embodiment of a method to detect special patterns.
Figure 10:
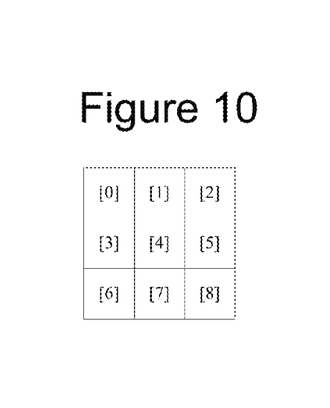
FIG. 10 shows an example of a 3×3 pixel window.

FIG. 9 shows a flowchart of an embodiment to detect special patterns in the original input image. The process operates on the pixels of the initial input image, layer 1×. Using a window of 3×3 pixels, such as that shown in FIG. 10, the process determines if they represent a chessboard or basket weave pattern at 114. In one embodiment of this process, it calculates the differences between all of the neighboring pixels and the central pixel [4] in FIG. 10 as p_diff[i]=abs(pix[i]−pix[4]). For the horizontal/vertical pixels 1, 3, 5 and 7, the process counts the number hv_cb_count (chessboard count) of p_diff[i]> Cb_Inter_Diff_Thr (which is a chessboard threshold) and calculates the average hv_cb_diff of p_diff[i]. For the diagonal pixels, 0, 2, 6 and 8, the process counts the number bw_cb_count (basket weave count) of p_diff[i]> Cb_Inter_Diff_Thr, and calculates the average bw_cb_diff of p_diff[i].

This information is then used by the decision block 116 based upon the following conditions:
If bw_cb_diff>Cb_Inter_Diff_Thr and
hv_cb_diff<Cb_Intra_Diff_Thr and
(bw_cb_count−hv_cb_count)>2, current pixel is in a basket weave.
If hv_cb_diff>Cb_Inter_Diff_Thr and
bw_cb_diff<Cb_Intra_Diff_Thr and
(hv_cb_count−bw_cb_count)>2, current pixel is in a chessboard.

The process first finds the maximum max_inter_diff and minimum min_inter_diff among all p_diff[i] except p_diff[4]. If max_inter_diff>Cb_Inter_Diff_Thr and (max_inter_diff−min_inter_diff)<Cb_Intra_Diff_Thr, the current pixel may be an isolated pixel at 116. While the description above implies a binary decision, such as a pixel is or is not part of a chessboard pattern, a person skilled in the art should realize that it is possible to replace a binary output with a probability or fuzzy logic value and use that value in later steps.

In order to determine one-pixel lines, the process uses the 3×3 window at 90. Directional difference masks are then applied for horizontal 92, vertical 94, diagonal 96 and anti-diagonal masks 98. Examples of these masks are shown below:

horizontal $$\begin{pmatrix} -1 & 2 & -1 \\ -1 & 2 & -1 \\ -1 & 2 & -1 \end{pmatrix}$$

vertical $$\begin{pmatrix} -1 & -1 & -1 \\ 2 & 2 & 2 \\ -1 & -1 & -1 \end{pmatrix}$$

diagonal $$\begin{pmatrix} 2 & -1 & -1 \\ -1 & 2 & -1 \\ -1 & -1 & 2 \end{pmatrix}$$

anti-diagonal $$\begin{pmatrix} -1 & -1 & 2 \\ -1 & 2 & -1 \\ 2 & -1 & -1 \end{pmatrix}.$$

These masks are used to convolve the data and get the features (h_fes, v_fea, d_fea, ad_fea) for these directions. The process then selects the direction with the maximum of absolute value of features. The feature is marked as s_fea and the feature at the orthogonal direction is o_fea. If abs(s_fea−k*abs(o_fea)) is larger than a threshold, Thin_Line_Fea_Thr, the current pixel is on a thin line at 112.

A similar process may be performed for two-pixel lines operating on 4×4 windows of pixels at 100. Directional difference masks are applied for horizontal 102, vertical 104, diagonal 106 and anti-diagonal 108. Examples of these masks are shown below:

horizontal $$\begin{pmatrix} -1 & 1 & 1 & -1 \\ -1 & 1 & 1 & -1 \\ -1 & 1 & 1 & -1 \\ -1 & 1 & 1 & -1 \end{pmatrix}$$

vertical $$\begin{pmatrix} -1 & -1 & -1 & -1 \\ 1 & 1 & 1 & 1 \\ 1 & 1 & 1 & 1 \\ -1 & -1 & -1 & -1 \end{pmatrix}$$

diagonal $$\begin{pmatrix} 1 & 1 & -1 & -1 \\ -1 & 1 & 1 & -1 \\ -1 & -1 & 1 & 1 \\ 0 & 0 & -1 & 1 \end{pmatrix}$$

anti-diagonal $$\begin{pmatrix} -1 & -1 & 1 & 1 \\ -1 & 1 & 1 & -1 \\ 1 & 1 & -1 & -1 \\ 1 & -1 & 0 & 0 \end{pmatrix}.$$

These masks are used to convolve the data and get the features (h_fes, v_fea, d_fea, ad_fea) for these directions. The process then selects the direction with the maximum of absolute value of features. The feature is marked as s_fea and the feature at the orthogonal direction is o_fea. If abs(s_fea−k*abs(o_fea)) is larger than a threshold, Thin_Line_Fea_Thr, the current pixel is on a thin line at 110.

The results of the one- and two-pixel line judgments are then sent to the thin line decision module 118. The results of this decision module and the results of the chessboard and isolated pixel decision module 116 are then processed by the hard match features at 120. For each 4×4 block, the process then sums the number of pixels (or their probability or fuzzy logic values) that are thin lines, chessboards or isolated, which requires retrieving pixels in an 8×8 block. The sum is a measure to evaluate the thin line, isolated pixel, and checkerboard strength in a block. The result tl_strg=min(tl_k*max (thin_line_num−tl_coring, 0), max_strg), is then output.

Figure 11:
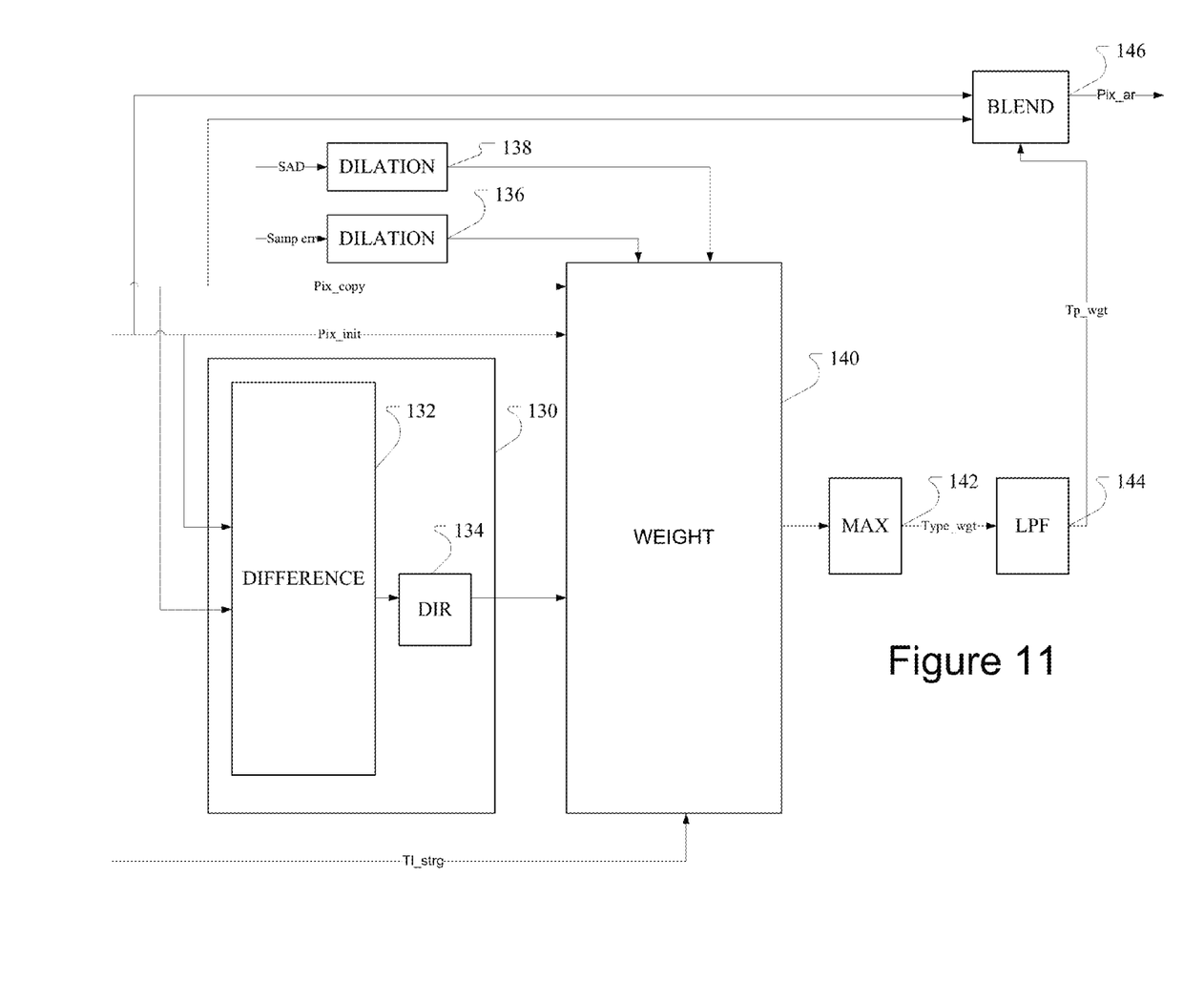
FIG. 11 shows an embodiment of a flowchart of a method to handle special patterns in copying image data to a high resolution layer.

Because copying data from the layer 1× is only valid for textures/edges that do not involve the above patterns, it is necessary to prevent the artifacts by not copying from 1× in these areas. The process uses the initial super-resolution results for those pixels that are near special patterns or for which there is no match. FIG. 11 shows the overall process of blending between the initial super resolution image and the copy image data.

The process performs dilation in 3×3 windows of the patch sad at 138 and samp error at 136 (sample error). In the preferred embodiement, the patch size is 2×2 and the SAD and samp_error is calculated on a 4×4 area that is extended from the patch. For example, the discussion only addresses the dilation for sad as an example. In 3×3 window of the current sad (sad_cur), find the two largest sad measurements (sad_1st, sad_2nd), then fuse them as sad_ref=(3*sad_1st+sad_2nd)/4.

Differences are taken between the initial SR pixels pix_init and those that are prospectively to be copied pix_copy in a 3×3 window by the difference module 132. An inter-difference calculation between copied data and initial SR results is calculated in four directions (horizontal, vertical, diagonal, and anti-diagonal) as follows:

hori_inter_diff=(abs(pix_copy[3]-pix_init[3])+abs(pix_copy[4]-pix_init[4])+bs(pix_copy[5]-pix_init[5]))/3;
vert_inter_diff=(abs(pix_copy[1]-pix_init[1])+abs(pix_copy[4]-pix_init[4])+abs(pix_copy[7]-pix_init[7]))/3;
diag_inter_diff=(abs(pix_copy[2]-pix_init[2])+abs(pix_copy[4]-pix_init[4])+abs(pix_copy[6]-pix_init[6]))/3;
anti_inter_diff=(abs(pix_copy[0]-pix_init[0])+abs(pix_copy[4]-pix_init[4])+abs(pix_copy[8]-pix_init[8]))/3.

The difference module also calculates an intra-difference for the 3×3 window of the current pixel in the initial super-resolution image as follows:

hori_intra_diff=max(abs(pix_init[3]-pix_init [4]),max (abs(pix_init [4]-pix_init [5]),abs(pix_init [3]-pix_init [5])));
vert_inter_diff=max(abs(pix_init [1]-pix_init [4]),max (abs(pix_init [4]-pix_init [7]),abs(pix_init [1]-pix_init [7]));
diag_intra_diff=max(abs(pix_init [2]-pix_init [4]),max (abs(pix_init [4]-pix_init [6]),abs(pix_init [2]-pix_init [6])));
anti_intra_diff=max(abs(pix_init [0]-pix_init [4]),max (abs(pix_init [4]-pix_init [8]),abs(pix_init [0]-pix_init [8]))).

The direction module 134 then determines the optimal direction. The module calculates the difference between inter-difference and intra-difference at each direction respectively. It then selects the direction which has the maximal difference indicating where there is the biggest change. In this direction, copying from layer 1× may cause the largest errors.

The weight module uses this information and the results of the dilation processes, as well as the thin line strength determined previously, to weight the results. A larger weight indicates that it is better to use the initial super-resolution results than to copy the results from layer 1×. If the following conditions are met, the weighting module assigns a large weight: the thin-line strength is large, the sad is large, the pixel difference between the initial super-resolution results and the copied results is large; the results are given a big weight to favor using the initial super-resolution results.

If there is a large sad, and the thin-line strength or the sample error is also large, the process assigns a large weight. If there is a small sad, the thin-line strength is large, the sad is larger than the sample error multiplied by a constant K, and the difference between the inter-difference and the intra-difference in the selected direction is large, a large weight is applied. For outlier pixels, if the pixel difference is large, the thin-line strength is large and the sad is not small, the process assigns a large weight.

After the weights are assigned, the maximum weight is chosen 142 and then low pass filtered in a 3×5 window surrounding it at 144. This result in tp_wgt. The blending module 146 uses the weight, the pixel copied and the initial super-resolution pixel to determine the final value for the super resolution pixel in the super resolution layer.

If a directional based scaler (2D scaler) is used for the initial super-resolution layer, then the quality of the 2D scaling process, which is the confidence that the scaler has found a unique edge, can also be used in the decision process. This weight would be similar to the tl_strg measurement calculated previously and could be used in place of or in addition to the tl_strg value calculated using the 1× layer. Both tl_strg and 2D scaler weight are detecting the presence of a feature that 2D scaling will generate a better result than the 1× copy process. The decision logic described above is comparing the error of using the 2D scaler versus the error of copying to generate a patch of the Sx layer.

In this manner, the original input image data can be copied to the final super-resolution image layer selectively. This allows for better detail and avoidance of edges that appear like an oil painting, while accommodating those areas in which the initial super-resolution image data gives a better result than the copied information.

It will be appreciated that several of the above-disclosed and other features and functions, or alternatives thereof, may be desirably combined into many other different systems or applications. Also that various presently unforeseen or unanticipated alternatives, modifications, variations, or improvements therein may be subsequently made by those skilled in the art which are also intended to be encompassed by the following claims.

What is claimed is:

1. A method of generating a super-resolution image from a single frame of image data, comprising:
   receiving, at a processor, a frame of image data have a first resolution as an original image layer;
   generating an estimated super-resolution image as a high resolution image layer, the estimated super-resolution image having a second resolution, the second resolution being higher than the first resolution from the frame of original image data;
   generating a low resolution image layer by down sampling the frame of image data, the low resolution image layer having a resolution lower than the first resolution;
   down sampling the estimated super-resolution image to produce an intermediate image layer having an intermediate resolution between the first resolution and the second resolution;
   identifying a first patch in one of the high resolution image layer, the intermediate image layer, or the low resolution image layer;
   searching one of the high resolution image layer, the intermediate image layer or the low resolution image layer, wherein the image layer being searched is different than the image layer in which the first patch was identified, for a second patch that matches the first; and
   selectively copying image data from the original image layer to the super-resolution image layer to produce a final super-resolution image, wherein image data copied from the original image layer corresponds to the second patch.

2. The method of claim 1, further comprising:
   searching for a match between the intermediate image layer and the low resolution image layer; and
   wherein selectively copying image data comprises copying image data from a location in the original image layer corresponding to a location of the match in the low resolution image layer.

3. The method of claim 1, further comprising:
   searching for a match between a region in the intermediate image layer and a region in the low resolution image layer;
   determining that the generating of the estimated super-resolution image layer results in a more accurate match than copying image data from a location in the original image layer corresponding to a location of the match in the low resolution image layer.

4. The method of claim 3, further comprising analyzing the region in the original resolution image layer to determine if the region contains a special pattern.

5. The method of claim 4, wherein analyzing the region comprises applying at least one difference mask and determining a type of special pattern.

6. The method of claim 4, wherein selectively copying image data from the original layer comprises not copying image data form the original layer and using image data from the estimated super-resolution image.

7. The method of claim 4, wherein the special pattern comprises one of a single pixel wide line, a two pixel wide line, a chessboard pattern, a basket weave pattern, and an isolated pixel.

8. The method of claim 1, wherein generating the estimated super-resolution image comprises one of 1D scaling, direction-guided scaling, single frame super resolution and multi-frame super resolution.

9. The method of claim 1, wherein down sampling the estimated super-resolution image to produce an intermediate image layer comprises applying a one-dimensional polyphase filter to the estimated super-resolution image data.

10. The method of claim 1, wherein generating a low resolution image layer comprises applying a one-dimensional polyphase filter to the original image data.

11. The method of claim 1, wherein down sampling the frame of image data and down sampling the estimated super-resolution image use a same scaling factor.

12. The method of claim 11, wherein the same scaling factor is less than 1 but larger than 0.5.

* * * * *